Patented Jan. 19, 1932

1,841,973

UNITED STATES PATENT OFFICE

MAX NAUMANN, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PRODUCTION OF METAL CARBONYLS

No Drawing. Application filed January 17, 1931, Serial No. 509,531, and in Germany February 12, 1930.

The present invention relates to improvements in the production of metal carbonyls.

In the manufacture and production of metal carbonyls by the action of carbon monoxide under pressure on materials capable of forming carbonyls, the carbonyls withdrawn in the liquid state from the pressure-tight apparatus evolve considerable amounts of carbon monoxide or gases containing carbon monoxide when the pressure is released to atmospheric pressure and these amounts of gas must be again compressed if they are to be used again in reactions under pressure.

I have now found that it is especially advantageous not to release the pressure on the liquid metal carbonyls containing dissolved gas directly to atmospheric pressure, but to release the pressure in different stages. In this manner the amounts of gas set free at the single stages of pressure may be used for reactions for which they are under the desired pressure, as for example for the preparation of carbonyls at lower pressures, for the production of carbon black by thermal decomposition of carbon monoxide under pressure in the presence of metal carbonyls or for other reactions in which carbon monoxide is used and when necessary the metal carbonyls still present in the gas may be more or less completely removed by the usual methods, as for example by means of adsorbents or by cooling.

The pressure on the gases which have been partly released from pressure may of course be increased again. For this purpose, for example the single stages of released pressure may be brought into connection with the corresponding stages of a multi-stage compressor plant whereby the gases set free are again compressed to a higher pressure, if desired together with fresh gas.

One advantage of the process according to the present invention consists in the fact that the compression energy of the dissolved gases is to a large extent saved. The process has the further advantage that the separation by cooling of the carbonyl carried along by the gases, set free on releasing the pressure is substantially facilitated.

The following example will further illustrate the nature of this invention, but the invention is not restricted to this example.

Example

Iron carbonyl which has been prepared by the action of carbon monoxide on iron under a pressure of 200 atmospheres is passed, in the liquid state and together with the gas dissolved therein, from the pressure-tight apparatus into a container and first released from pressure to 100 atmospheres. In this manner half of the carbon monoxide dissolved in the carbonyl is set free and is withdrawn under the said pressure of 100 atmospheres and led to a pressure container for carbon monoxide from which other vessels for the preparation of iron carbonyl under a pressure of 100 atmospheres are fed. The liquid carbonyl saturated with carbon monoxide passes from the 100 atmospheres stage to the 50 atmospheres and 20 atmospheres stages. The carbon monoxide set free in these stages is compressed again together with fresh gas. The amount of gas set free when the pressure is finally released to atmospheric pressure is usually small so that it may be led into the fresh gas container without having regard to its carbonyl content.

What I claim is:—

1. In the production of metal carbonyl by the action of carbon monoxide under superatmospheric pressure on a material capable of forming a metal carbonyl, the steps which comprise withdrawing the metal carbonyl formed in the liquid state from the reaction space and releasing the pressure on said carbonyl in at least two stages.

2. In the production of iron carbonyl by the action of carbon monoxide under superatmospheric pressure on a material capable of forming iron carbonyl, the steps which comprise withdrawing the iron carbonyl formed in the liquid state from the reaction space and releasing the pressure on said carbonyl in at least two stages.

3. In the production of iron carbonyl by the action of carbon monoxide under a pressure of about 200 atmospheres on a material capable of forming iron carbonyl, the steps which comprise withdrawing the iron carbonyl formed in the liquid state from the reaction space, releasing the pressure on said carbonyl first to about 100 atmospheres, withdrawing the gas disengaged thereby, and then further releasing the pressure on said iron carbonyl.

In testimony whereof I have hereunto set my hand.

MAX NAUMANN.